US012661927B2

(12) United States Patent
Rodrigues

(10) Patent No.: US 12,661,927 B2
(45) Date of Patent: Jun. 23, 2026

(54) WHEEL COVER DEVICE FOR A VEHICLE

(71) Applicant: Daimler Truck North America LLC, Portland, OR (US)

(72) Inventor: Matthew Rodrigues, Oregon City, OR (US)

(73) Assignee: Daimler Truck North America LLC, Portland, OR (US)

( * ) Notice: Subject to any disclaimer, the term of this patent is extended or adjusted under 35 U.S.C. 154(b) by 170 days.

(21) Appl. No.: 18/247,511

(22) PCT Filed: Sep. 27, 2021

(86) PCT No.: PCT/US2021/071600

§ 371 (c)(1),
(2) Date: Mar. 31, 2023

(87) PCT Pub. No.: WO2022/072986

PCT Pub. Date: Apr. 7, 2022

(65) Prior Publication Data

US 2025/0128541 A1 Apr. 24, 2025

Related U.S. Application Data

(60) Provisional application No. 63/086,789, filed on Oct. 2, 2020.

(51) Int. Cl.
*B60B 7/04* (2006.01)
*B60B 7/06* (2006.01)

(52) U.S. Cl.
CPC ................ *B60B 7/04* (2013.01); *B60B 7/066* (2013.01)

(58) Field of Classification Search
CPC .. B60B 7/066; B60B 7/04; B60B 7/06; B60B 7/14; B60B 7/061
See application file for complete search history.

(56) References Cited

U.S. PATENT DOCUMENTS 4,346,940 A 8/1982 Tatar
4,687,124 A 8/1987 Mahr
(Continued)

FOREIGN PATENT DOCUMENTS

CN 103108800 A 5/2013
CN 103879391 A 6/2014
(Continued)

OTHER PUBLICATIONS

PCT/US2021/071600, International Search Report dated Dec. 13, 2021 (Two (2) pages).
(Continued)

*Primary Examiner* — S. Joseph Morano
*Assistant Examiner* — Alex Palmer
(74) *Attorney, Agent, or Firm* — ArentFox Schiff LLP

(57) ABSTRACT

A wheel cover device includes a mounting bracket mounted to a vehicle wheel; a first fastener with a first thread on the mounting bracket; a covering panel covering the wheel and having a through opening; a button movably held on the mounting bracket and the first fastener, the button having a peg; a spring supported on the mounting bracket and the button; and a second fastener with a second thread, a receptacle, and a ramp. In order to fix the covering panel to the first fastener, the second fastener is inserted into the through opening and is rotated in relation to the covering panel, so that the first fastener and the button screw the fasteners together by the threads thereby causing the peg to slide along and from the ramp into the receptacle to tension the spring and thereby tension the peg into the receptacle.

10 Claims, 8 Drawing Sheets

(56) References Cited

U.S. PATENT DOCUMENTS

| | | | |
|---|---|---|---|
| 9,327,550 | B2 | 5/2016 | Butler et al. |
| 10,543,716 | B1 | 1/2020 | Mavrofrides |
| 2013/0015698 | A1 | 1/2013 | Butler et al. |
| 2014/0265533 | A1 | 9/2014 | Polka |
| 2016/0207352 | A1 | 7/2016 | Butler et al. |

FOREIGN PATENT DOCUMENTS

| | | | |
|---|---|---|---|
| CN | 105691092 | A | 6/2016 |
| CN | 110546016 | A | 12/2019 |
| DE | 102012017709 | A1 | 3/2013 |
| JP | S63-141801 | A | 6/1988 |

OTHER PUBLICATIONS

PCT/US2021/071600, International Preliminary Report on Patentability (PCT/IB/326 and PCT/IB/373) dated Apr. 13, 2023, with partial English translation, enclosing Written Opinion of the International Searching Authority (PCT/ISA/237) (Eight (8) pages).
Extended European Search Report received for EP Patent Application No. 21876686.3, mailed on Feb. 18, 2026, 11 pages.
Office Action issued Mar. 26, 2026 for Chinese Patent Application No. 202180080693.8, 13 pages.

WHEEL COVER DEVICE FOR A VEHICLE

CROSS-REFERENCE

The present application claims the priority to and benefit of U.S. Application No. 63/086,789, filed on Oct. 2, 2020. The aforementioned patent application is hereby incorporated by reference in its entirety.

BACKGROUND AND SUMMARY OF THE INVENTION

Field of the Invention

The invention relates to a wheel cover device for a vehicle, in particular a commercial vehicle.

Background Information

U.S. Pat. No. 9,327,550 B2 shows a wheel cover system comprising a bracket assembly configured to couple to a wheel. The wheel cover system further comprises a disk assembly, which comprises an inner portion. The wheel cover system also comprises a push and turn securing mechanism coupled to the bracket assembly and compatible with the inner portion of the disk assembly.

It is an object of the present invention to provide a wheel cover device such that at least one wheel of a vehicle may be covered by the wheel cover device in a particularly advantageous way.

This object is solved by a wheel cover device as described herein. Advantageous embodiments with expedient developments are also described herein.

SUMMARY OF THE INVENTION

A first aspect of the invention relates to a wheel cover device for a vehicle such as, for example, a commercial vehicle. The wheel cover device comprises a mounting bracket which is configured to be mounted to a wheel of the vehicle. For example, the mounting bracket may be mounted to a hub of said wheel. The wheel cover device further comprises a first fastening element which is provided on the mounting bracket. For example, the mounting bracket and the first fastening element are configured as separately manufactured components which may be connected with each other. The first fastening element has a first thread which may be configured as an external thread. The wheel cover device also comprises a covering panel for covering the wheel in the axial direction of the wheel. For example, with regard to a completely assembled state of the vehicle and thus the wheel cover device, the wheel is covered in the axial direction of the wheel towards the outside at least partially, in particular at least predominantly or completely, by the covering panel, which, in the completely assembled state of the vehicle and the wheel cover device, is, in particular removably, attached to the wheel, in particular to said hub of the wheel. The covering panel has a through opening. Furthermore, the wheel cover device comprises a button which is movably held on the mounting bracket and the first fastening element. This means the button may be, in particular translationally, moved in relation to the mounting bracket and the first fastening element. For example, with respect to the completely assembled state of the vehicle, the button may be translationally moved in relation to the mounting bracket and the first fastening element in the axial direction of the wheel. The button comprises at least one peg.

Additionally, the wheel cover device comprises a spring which is at least indirectly, in particular directly, supported on the mounting bracket and the button. For example, with respect to the completely assembled state of the vehicle, the spring is supported on the button and the first fastening element in the axial direction of the wheel. With respect to the completely assembled state of the vehicle, the axial direction of the wheel coincides with a moving direction along which the button may be translationally moved in relation to the first fastening element. Moreover, the spring is supported on both the button and the first fastening element along the moving direction. Thus, for example, by moving the button in a first direction extending parallel to the moving direction, the spring is tensioned, in particular compressed. By tensioning the spring, the spring provides a spring force acting in a second direction on the button, the second direction being opposite to the first direction and extending parallel to the moving direction. For example, the button may be moved by the spring force in the second direction.

The second fastening element has a second thread which may be configured as an internal thread. Preferably, the threads correspond with each other such that the threads and thus the fastening elements may be screwed together by rotating the fastening elements in relation to each other and/or around a rotation axis. Preferably, the rotation axis coincides with the moving direction. Moreover, the second fastening element comprises at least one receptacle and at least one ramp. Preferably, the receptacle and the ramp are arranged on a backside of the second fastening element, wherein, with respect to the completely assembled state of the vehicle, the backside faces towards the wheel in the axial direction of the wheel. Moreover, with respect to the completely assembled state of the vehicle, the backside faces towards the first fastening element and the mounting bracket. For fixing the covering panel to the first fastening element and thus the mounting bracket and the wheel, the second fastening element is configured to be inserted into the through opening and, subsequently, rotated in relation to the covering panel, the button and the first fastening element, in particular around said rotation axis. In other words, in order to fix or attach the covering panel to the first fastening element and thus to the mounting bracket and the wheel, the second fastening element is inserted into the through opening, in particular in such a way that the second fastening element penetrates the through opening. Subsequently, the second fastening element is rotated in relation to the covering panel, the first fastening element and the button whilst the second fastening element penetrates the through opening. By rotating the second fastening element in relation to the covering panel, in relation to the button, and in relation to the first fastening element whilst the second fastening element penetrates the through opening, the fastening elements may be screwed together by the threads. Thereby, the covering panel is fixed to the first fastening element and the mounting bracket by the second fastening element.

In other words, the second fastening element is configured to interact with the covering panel in such a way that the covering panel is attached or fixed to the first fastening element and thus the mounting bracket when the fastening elements are screwed together by the threads. In this regard, for example, the second fastening element has a collar which may be supported on the covering panel in the axial direction of the wheel towards the wheel such that the second fastening element may fix the covering panel to the first fastening element via said collar. Moreover, by screwing the fastening elements together by the threads, the peg is caused to slide along the ramp and from the ramp into the receptacle. Since, for example, the ramp increasingly rises over its extension running in the circumferential direction of the second fastening element, in particular starting from the backside or from a surface of the backside, the peg and thus the button are moved in said first direction when screwing the fastening elements together by the threads (i.e. when the peg slides along the increasingly rising ramp). In this regard, the ramp increasingly rises along the axial direction of the wheel, in particular along the moving direction or in the first direction. Thus, the spring is tensioned. By further rotating the second fastening element in relation to the covering panel, the first fastening element and the button, the peg, after sliding along the increasingly rising ramp, is moved from the ramp into the receptacle. As a consequence, the spring may partially relax such that the button and thus the peg are moved in the second direction by the spring (i.e. the spring force). Thereby, the peg is moved into the receptacle by the spring or the spring force. When the peg is in the receptacle, preferably, the spring is still tensioned such that the peg is tensioned into the receptacle by the spring or the spring force.

Preferably, the receptacle is limited in the circumferential direction of the second fastening element in such a way that the receptacle is limited both in a first direction of rotation and a second direction of rotation, wherein the first direction of rotation and the second direction of rotation coincide with the circumferential direction of the second fastening element, and wherein the second direction of rotation is opposite of the first direction of rotation. Thus, the second fastening element is secured against rotation in both the first and second directions of rotation in relation to the first fastening element, the mounting bracket, and the button. As a consequence, the covering panel is securely held on the wheel.

In order to dismount the covering panel from the wheel, the button is moved, in particular pushed, such as to move the button in the first direction in relation to the covering panel and the fastening elements. Particularly, the button is moved in the first direction in such a way that the peg is moved out of the receptacle. As a consequence, the second fastening element may be rotated in relation to the covering panel, the first fastening element and the button such that the fastening elements may be unscrewed.

The invention may help increase the fuel economy of the vehicle through improved aerodynamics along the wheel which may be configured as a rear wheel, for example. The mounting bracket, the fastening elements, the spring, and the button may form an attaching mechanism by which the covering panel may be mounted to and dismounted from the wheel in a particularly easy way. Moreover, the attaching mechanism may be low cost, durable and may allow for tire serviceability. The attaching mechanism may be designed to be robust as well as provide audible and tactile feedback to a person mounting the covering panel to the wheel. For example, when the second fastening element is rotated in relation to the covering panel, the first fastening element and the button in such a way that the spring relaxes and thus moves the button and the peg in the second direction such that, as a consequence, the peg engages the receptacle and is tensioned into the receptacle by the spring or the spring force, said person may see, feel and/or hear this movement of the button and the peg into the second direction since, for example, a clicking noise may occur when the peg engages the receptacle. Said clicking noise may occur since, for example, the peg is moved against a wall area of the second fastening element by the spring, the second wall area bounding the receptacle in the second direction, in particular in the axial direction of the wheel towards the outside with respect of the completely assembled state of the vehicle. Furthermore, costs of the components of the wheel cover device may be kept particularly low such that the costs of the wheel cover device may be kept particularly low. Moreover, particularly advantageous aerodynamics of the vehicle may be realized by the wheel cover device such that an energy consumption, in particular fuel consumption, of the vehicle may be kept particularly low.

A second aspect of the invention relates to a wheel cover device for a vehicle such as, for example, a commercial vehicle. The wheel cover device according to the second aspect of the invention comprises a mounting bracket which is configured to be mounted to a wheel of the vehicle. For example, the mounting bracket may be mounted to a hub of the wheel. The wheel cover device according to the second aspect of the invention further comprises a fastening element which is provided on the mounting bracket. For example, the mounting bracket and the fastening element are configured as separately manufactured components which may be connected with each other. The fastening element has a first thread which may be configured as an external thread. The fastening element according to the second aspect of the invention further comprises at least one ramp and at least one receptacle. The wheel cover device according to the second aspect of the invention also comprises a covering panel for covering the wheel in the axial direction of the wheel, for example with regard to a completely assembled state of the vehicle and thus the wheel cover device. The wheel is covered in the actual direction of the wheel towards the outside at least partially, in particular at least predominantly or completely, by the covering panel, which, in the completely assembled state of the vehicle and the wheel cover device, is, in particular, removable attached to the wheel, in particular to the hub of the wheel. The covering panel has a through opening. Moreover, the wheel cover device according to the second aspect comprises a handle having a grip portion for manually rotating the handle. In other words, a person may grasp the grip portion and, subsequently, rotate the grip portion and thus the handle, in particular around a rotation axis. The handle also has a peg portion comprising at least one peg.

Additionally, the handle has a threaded portion which comprises a second thread. For example, the second thread may be configured as an internal thread. The threaded portion is translationally movable in relation to the grip and peg portions along a moving direction. This means the peg portion is translationally movable into a first direction in relation to the peg and grip portions, wherein the first direction is parallel to said moving direction. Moreover, the threaded portion is translationally movable into a second direction in relation to the peg and grip portions, wherein the second direction is parallel to said moving direction, and the second direction is opposite to the first direction. Furthermore, while the threaded portion is translationally movable along the moving direction in relation to the peg and grip portions, the threaded portion is connected with both the peg portion and the grip portion in a rotationally fixed manner. Moreover, the grip portion and the peg portion are connected with each other in a rotationally fixed manner. Thus, by rotating the grip portion, the grip portion, the peg portion and the threaded portion are rotated together. Moreover, the handle has at least one spring element which is preferably configured as a mechanical spring. The threaded portion is supported on the peg portion along the moving direction such that, for example, by translationally moving the threaded portion into said first direction in relation to the peg and grip portions, the spring element is tensioned, in particular compressed. As a result, the spring element provides a spring force acting into the second direction such that, for example, the threaded portion may be translationally moved into the second direction in relation to the peg and grip portions by said spring force.

For fixing the covering panel to the fastening element and thus the mounting bracket and the wheel, the handle is configured to be, in particular manually, inserted into the through opening and, subsequently, rotated via the grip portion in relation to the covering panel and the fastening element. In other words, in order to fix or attach the covering panel to the fastening element and thus to the mounting bracket and the wheel, the handle is inserted into the through opening, in particular in such a way that the handle penetrated the through opening. Subsequently, the handle is rotated via the grip portion in relation to the covering panel and the fastening element while the handle penetrates the through opening. By rotating the handle and thus the grip portion, the peg portion and the threaded portion in relation to the covering panel and in relation to the fastening element whilst the handle penetrates the through opening, the fastening element and the threaded portion may be screwed together by the threads. Thereby, the covering panel is fixed to the fastening element and thus the mounting bracket by the handle.

In this regard, for example, the handle may have a collar, which may be supported on the covering panel in the axial direction of the wheel towards the wheel such that the handle may fix the covering panel to the fastening element via said collar. Moreover, by screwing the fastening element and the threaded portion together and, thus, by rotating the handle in relation to the covering panel and in relation to the fastening element, the peg of the peg portion is caused to slide along the ramp such that the peg portion and the grip portion are translationally moved away from the fastening element in relation to the threaded portion along the moving direction. The grip and peg portions are translationally moved along the moving direction in relation to the threaded portion by the peg sliding along the ramp since the threaded portion already interacts with the fastening element by the threads thereby constraining or preventing the threaded portion from translationally moving together with the grip and peg portions. The handle may be rotated in relation to the fastening element and, subsequently the grip and peg portions may be translationally moved away from the fastening element in relation to the threaded portion along the moving direction by the peg sliding along the ramp until the peg reaches the receptacle of the fastening element. In other words, the peg may slide along the ramp or may be slid along the ramp as long as the peg reaches the receptacle. When the peg reaches the receptacle the spring element, which has been tensioned since the grip and peg portions has been translationally moved in relation to the threaded portion along the moving direction, relaxes at least partially thereby moving the peg into the receptacle while translationally moving the peg and grip portions in relation to the threaded portion along the moving direction. In other words, when the peg reaches the receptacle, the at least partially tensioned, in particular compressed, spring element relaxes such that the grip and peg portions are translationally moved in relation to the threaded portion and in relation to the fastening element along the moving direction by the relaxing spring element, in particular by the spring force. Thereby the peg of the peg portion is translationally moved in relation to the threaded portion and in relation to the fastening element along the moving direction such that the peg is translationally moved into the receptacle. As a result, the peg interacts with the fastening element in such a way that the handle is prevented or constrained from being rotated any further in relation to the covering panel and the fastening element. Thus, the covering panel is tightly fixed or attached to the fastening element and thus the wheel.

In order to remove the panel from the fastening element and thus the wheel, the grip portion and thus the peg portion are pulled and thus translationally moved in relation to the threaded portion and the fastening element along the moving direction. As a result, the peg of the peg portion is raised above the receptacle (i.e. the peg is moved out of the receptacle) thereby allowing the handle to be rotated or turned in such a way that the threads and thus the threaded portion and the fastening element are unscrewed. In other words, after moving the peg out of the receptacle, the handle may be manually rotated or turned in order to unthread the handle from the fastening element.

Further advantages, features, and details of the invention derive from the following description of a preferred embodiment as well as from the drawings. The features and feature combinations previously mentioned in the description as well as the features and feature combinations mentioned in the following description of the figures and/or shown in the figures alone may be employed not only in the respectively indicated combination but also in any other combination or taken alone without leaving the scope of the invention.

DETAILED DESCRIPTION OF THE DRAWINGS

In the figures the same elements or elements having the same function are indicated by the same reference signs.

Figure 1:
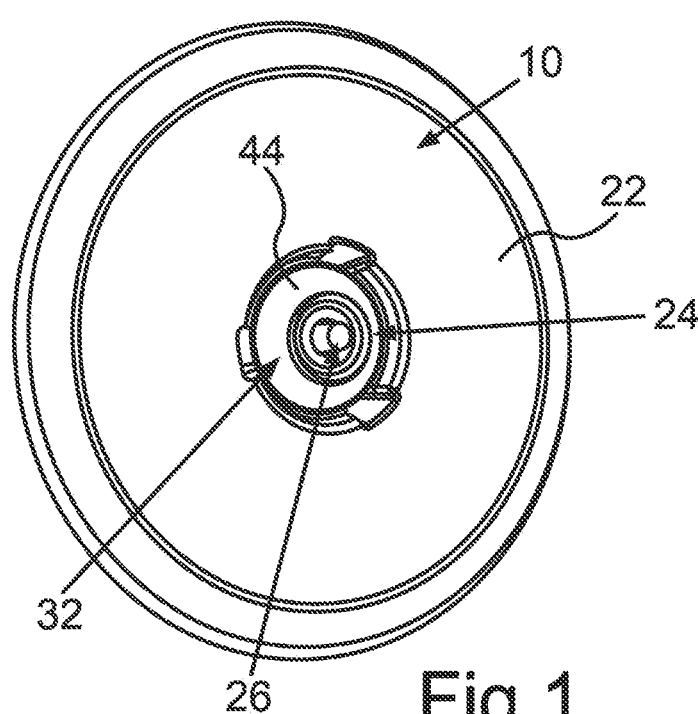
FIG. 1 is a schematic and perspective front view of a wheel cover device according to a first embodiment of the present invention.
Figure 2:
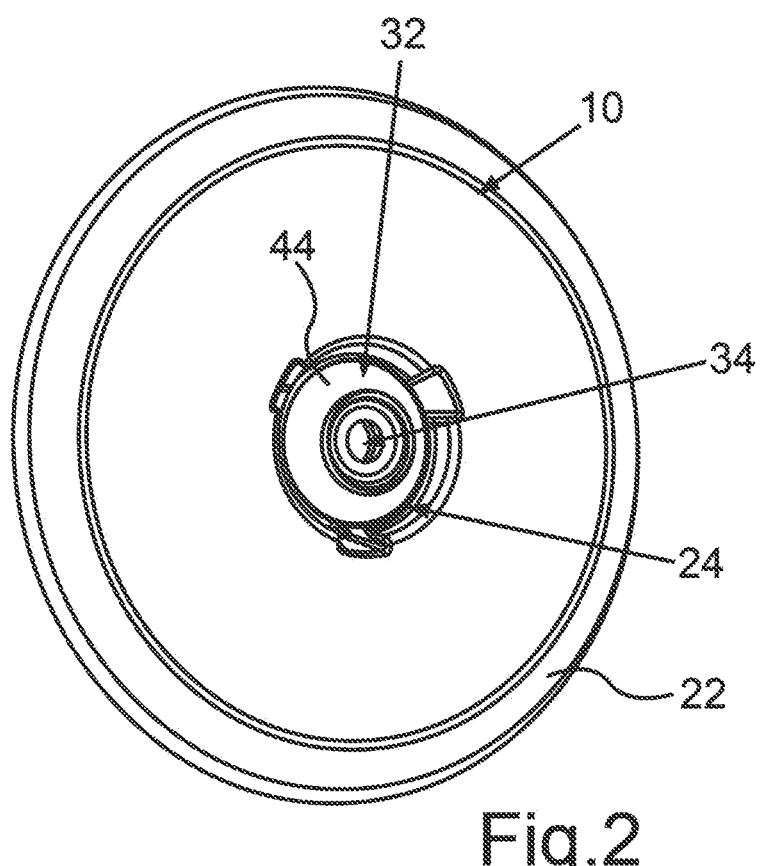
FIG. 2 is a schematic and perspective front view of a cover assembly of the wheel cover device, the cover assembly comprising a covering panel and a second fastening element.

FIG. 1 shows in a schematic and perspective front view a wheel cover device 10 for a vehicle, in particular for a commercial vehicle such as a truck. FIGS. 1 to 7 show a first embodiment of the wheel cover device. The wheel cover device 10 comprises a mounting bracket 12 (FIG. 5) which may be mounted to a wheel 14 (FIG. 5) of the vehicle. Particularly, the mounting bracket 12 may be mounted to a hub 16 of the wheel 14. For example, the wheel 14 may be a rear wheel of said vehicle. The mounting bracket 12 may be mounted to the hub 16 such that, for example, the wheel 14 and the mounting bracket 12 may rotate together around a rotation axis in relation to a frame and/or a body of the vehicle when the vehicle moves forwards.

Figure 6:
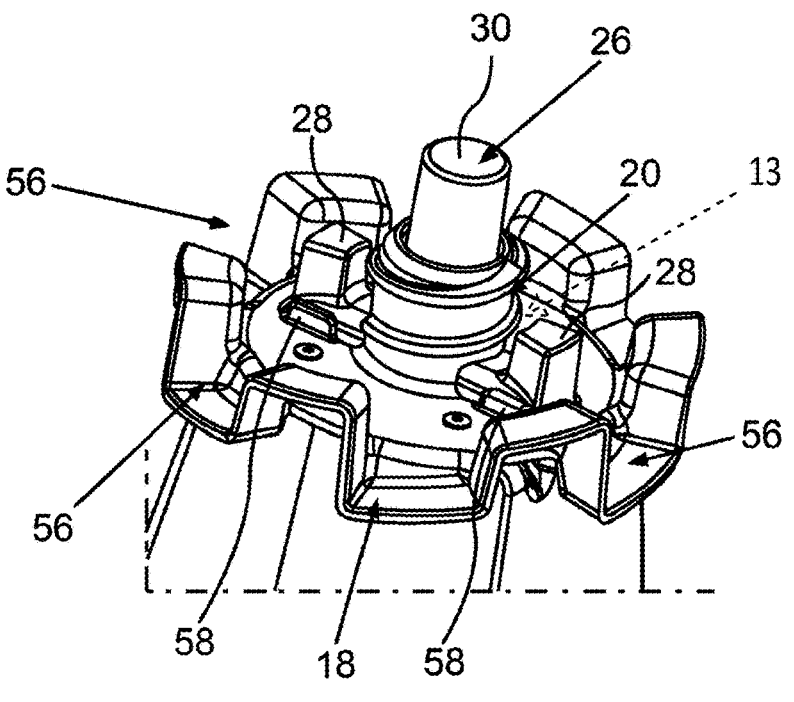
FIG. 6 is a schematic and perspective view of the first fastening element and the button.

The wheel cover device 10 comprises a first fastening element 18 provided on the mounting bracket 12. In the embodiment shown in the figures, the first fastening element 18 and the mounting bracket 12 are configured as separately manufactured components, wherein the first fastening element 18 is attached to the mounting bracket 12. The first fastening element 18 comprises a first thread 20 (FIG. 6). In the embodiment shown in the figures, the first thread 20 is configured as an external thread.

The wheel cover device 10 further comprises a covering panel 22 which may be made of, for example a plastic material. Alternatively, or additionally, the covering panel 22 may be formed in one piece. The covering panel 22 is configured to cover the wheel 14 in the axial direction of the wheel 14. For example, with respect to a completely assembled state of the vehicle, the covering panel 22 is fixed to the first fastening element 18 and thus to the mounting bracket 12 and wheel 14 such that, for example, the wheel 14 and the covering panel 22 may rotate together around the rotation axis when the vehicle moves forwards. Moreover, with respect of the completely assembled state of the vehicle, the wheel 14 is covered at least partially, in particular at least predominantly or completely, in the axial direction of the wheel 14 towards the outside. The axial direction of the wheel 14 coincides with the transverse direction of the vehicle. Moreover, the axial direction of the wheel 14 coincides with said rotation axis. The covering panel 22 has a central through opening 24.

The wheel cover device 10 also comprises a button 26 which is movably held on the mounting bracket 12 and the first fastening element 18 in such a way that the button 26 may be translationally moved in relation to the first fastening element 18 and the mounting bracket 12 along a moving direction coinciding with the axial direction of the wheel 14 in the completely assembled state of the vehicle. This means the button 26 may be moved in a first direction and in a second direction opposite of the first direction, wherein first and second directions extend parallel to the moving direction. With respect to the completely assembled state of the vehicle, the first direction points inwards in the axial direction of the wheel 14 or in the transverse direction of the vehicle, wherein the second direction points outwards in the axial direction of the wheel 14 or in the transverse direction of the vehicle. Furthermore, the button 26 comprises pegs 28 and an operating area 30 penetrating the through opening 24 when the covering panel 22 is fixed to the wheel 14.

Figure 5:
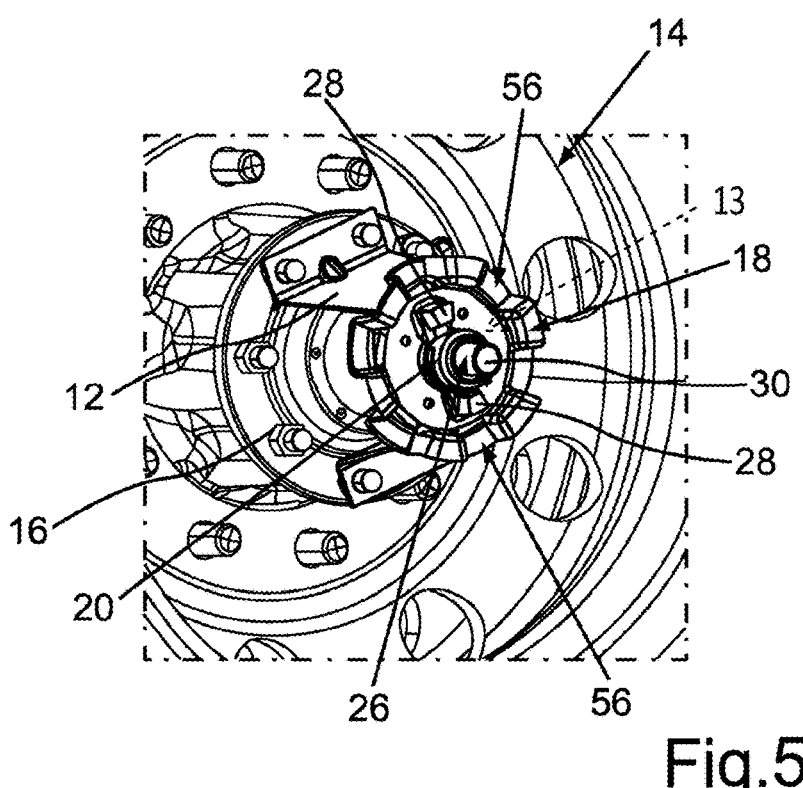
FIG. 5 is a schematic and perspective front view of a mounting bracket, a first fastening element and a button of the wheel cover device.

Referring to FIGS. 5 and 6 the wheel cover device 10 also comprises a spring. Preferably, the spring 13 is a mechanical spring. The spring 13 is supported on the mounting bracket 12 and the button 26 along said moving direction. Thus, by moving the button 26 in the first direction in relation to the mounting bracket 12 and the fastening element 18, the spring 13 is tensioned, in particular compressed. As a consequence, the spring 13 provides a spring force acting in the second direction on the button 26. Thus, for example, the button 26 and thus the pegs 28 may be moved by the spring force in the second direction in relation to the mounting bracket 12 and the fastening element 18.

Figures 3, 4:
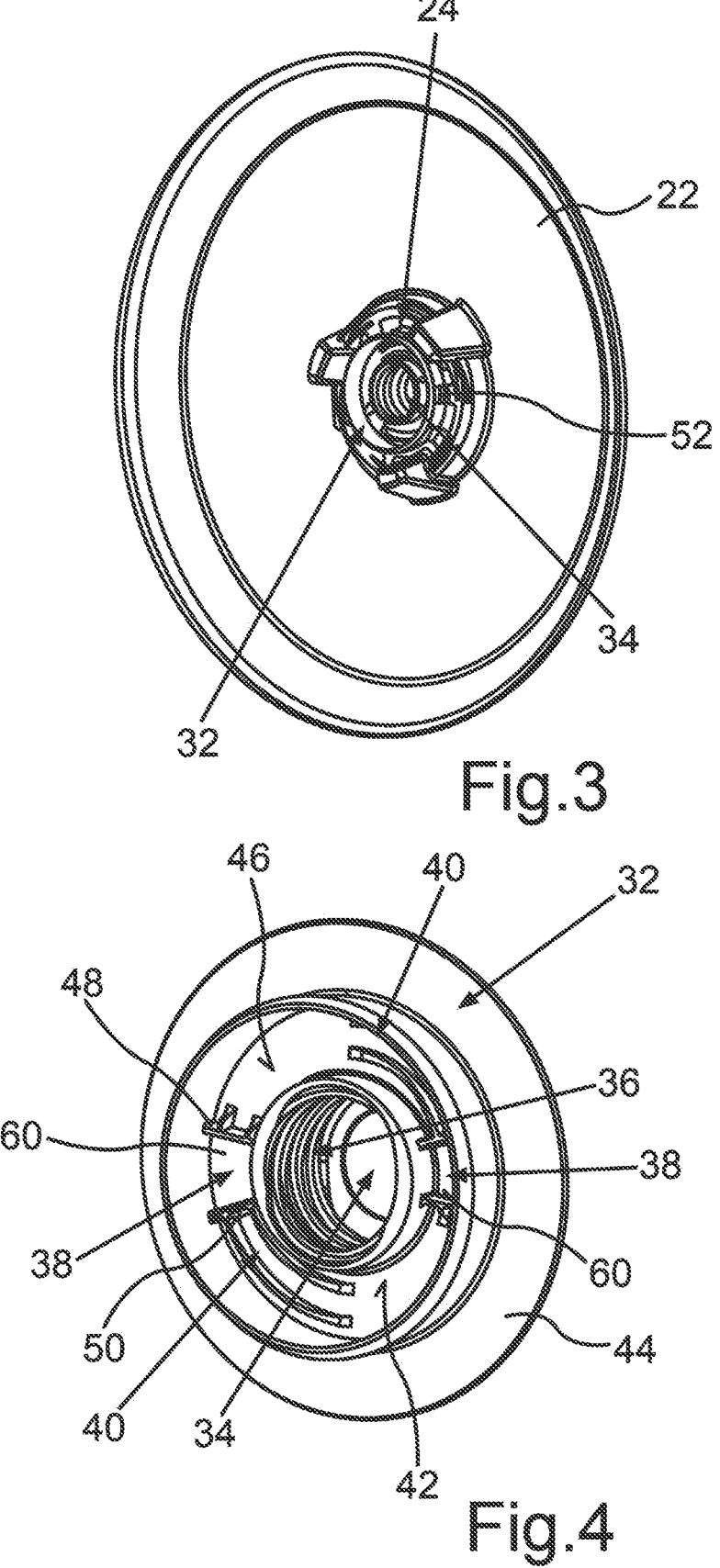
FIG. 3 is a schematic and perspective back view of the cover assembly.
FIG. 4 is a schematic and perspective back view of the second fastening element.

Moreover, the wheel cover device 10 comprises a second fastening element 32 which is, preferably separately manufactured from the covering panel 22 and the first fastening element 18. FIG. 4 shows that the second fastening element 32 comprises a second central through opening 34, a second thread 36, receptacles 38 and ramps 40. The receptacles 38 and the ramps 40 are arranged on a backside 42 of the second fastening element 32. With respect to the completely assembled state of the vehicle, the backside 42 faces towards the wheel 14 and thus the mounting bracket 12 and the first fastening element 18 in the axial direction of the wheel 14. In said completely assembled state of the vehicle, the covering panel 22 is fixed to the wheel 14 by means of the mounting bracket 12, the fastening element 18, the button 26 and the second fastening element 32. Preferably, the second thread 36 is configured as an internal thread. In an embodiment, the second thread 36 may be configured as a multi-start thread in order to more easily accommodate the first thread 20.

As will be discussed in greater detail below, in order to fix the covering panel 22 to the first fastening element 18 and thus the mounting bracket 12 and the wheel 14, the second fastening element 32 is inserted into the through opening 24 in such a way that the fastening element 32 penetrates the through opening 24. Subsequently, the fastening element 32 is rotated in relation to the covering panel 22, the fastening element 18, the button 26 and the mounting bracket 12 such that the fastening elements 32 and 18 are screwed together by the threads 20 and 36. Thereby, the fastening element 32 is moved in the first direction and thus towards the mounting bracket 12 and the wheel 14. Moreover, the fastening element 32 has a collar 44 which is supported on the covering panel 22 in the first direction such that, by moving the fastening element 32 in the first direction while the fastening element 32 penetrates the through opening 24, the covering panel 22 is also moved in the first direction. In other words, by screwing the fastening elements 18 and 32 together by the threads 20 and 36, the covering panel 22 is tightened by the fastening element 32 via its collar 44 in the first direction against the fastening element 18, thereby fixing the covering panel 22 to the fastening element 18 and thus the wheel 14.

When rotating the fastening element 32 in relation to the fastening element 18 and the button 26, in particular around said rotation axis, the pegs 28 are caused to slide along the respective ramps 40. The respective ramp 40 increasingly rises over its extension starting from the backside 42 or a surface 46 of the backside 42 and running along the circumferential direction of the fastening element 32, wherein the ramp 40 increasingly rises in the first direction. This means a height of the ramp 40 increases relative to the height extending in the first direction from the surface 46.

The respective ramp 40 rises until it reaches the receptacle 38. This means the respective ramp 40 ends at the respective receptacle 38. Moreover, the ramp 40 increasingly rises over its extension running in the circumferential direction of the fastening element 32, wherein the circumferential direction of the fastening element 32 extends around said rotation axis. In the circumferential direction of the fastening element 32, the respective receptacle 38 is limited by walls 48 and 50 of the fastening element 32 on both ends of the receptacle 38. This means that the respective receptacle 38 is limited in a first direction of rotation by the wall 48. Moreover, the respective receptacle 38 is limited in a second direction of rotation by the respective wall 50. The first and second directions of rotation extend in the circumferential direction of the fastening element 32 and thus around said rotation axis. Moreover, the second direction of rotation is opposite to the first direction of rotation. Thus, by causing the respective peg 28 to slide along the respective ramp 40, the pegs 28 and thus the button 26 are translationally moved in the first direction in relation to the fastening elements 18 and 32. Thereby, the spring is tensioned. By further rotating the fastening element 32, the respective peg 28 is moved in an overlap with the respective receptacle 38. As a consequence, the spring may relax partially such that the respective peg 28 is moved into the respective receptacle 38 by the spring or the spring force such that the respective peg 28 engages the respective receptacle 38. This means by screwing the fastening elements 18 and 32 together by the threads 20 and 36, the pegs 28 are caused to slide along the ramps 40 and from the ramps 40 into the receptacles 38. Thereby, this spring is tensioned in such a way that the spring moves the pegs 28 into the receptacles 38, wherein the spring is still tensioned when the pegs 28 are arranged in the receptacles 38 (i.e. when the pegs 28 engage the receptacles 38). Thus, the pegs 28 are tensioned into the receptacles 38 by the spring.

Figure 7:
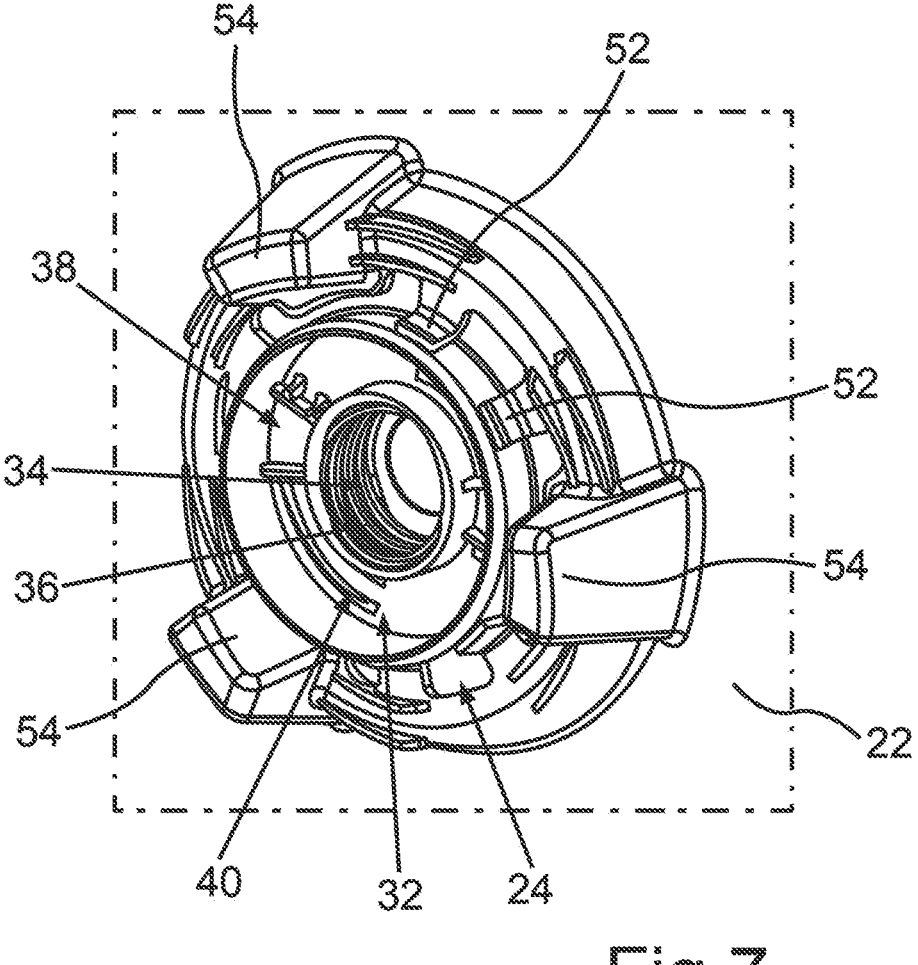
FIG. 7 is a part of a schematic and perspective back view of the cover assembly.

As shown by FIGS. 1, 3, and 7 the covering panel 22 and the second fastening element 32 form a cover assembly comprising two pieces. A first one of said pieces is the covering panel 22, and the second piece is the fastening element 32. The fastening element 32 may be used or may act as a fastening element 32 by which the covering panel 22 may be mounted to and dismounted from the wheel 14 in a need-based manner. Whilst the fastening element 32 penetrates the through opening 24 of the covering panel 22, the fastening element 32 is free to rotate inside the covering panel 22. The covering panel 22 comprises coupling elements such as, for example, clips 52 (FIG. 7) by which the second fastening element 32 is held in the through opening 24 and on the covering panel 22 in said moving direction and thus in the axial direction of the wheel 14. Moreover, the clips 52 allow the second fastening element 32 to be freely rotated in relation to the covering panel 22 whilst the fastening element 32 penetrates the through opening 24 of the covering panel 22. In other words, the covering panel 22 and the fastening element 32 are held together by the clips 52 along the moving direction whilst the clips 52 allow the fastening element 32 to be freely rotated inside the covering panel 22. Furthermore, the covering panel 22 has first locking elements 54. The first fastening element 18 has second locking elements 56. For example, the respective locking element 54 is a protrusion, wherein, for example, the respective locking element 56 is a receptacle. The locking elements 54 and 56 are configured to interact with each other thereby constraining the covering panel 22 from rotating in relation to the fastening element 18. In other words, the locking elements 54 may interlock with the locking elements 56 and thus the wheel-mounted fastening element 18. Moreover, the locking elements 54 and 56 provide for an alignment aid as the covering panel 22 is being attached or fixed to the wheel 14. The respective locking elements 54 and 56 have respective extensions along said moving direction and thus along the rotation axis and the transverse direction of the vehicle with respect to the completely assembled state of the vehicle. The extensions of the locking elements 54 and 56 are such that the threads 20 and 36 will not engage until the locking elements 54 are in a proper position in relation to the locking elements 56. For example, in said proper position, the locking elements 54 overlap the locking elements 56 or vice versa such that the locking elements 54 may be moved in the first direction in relation to the fastening element 18 thereby moving the locking elements 54 into the locking elements 56. As a consequence, the threads 20 and 36 may be screwed together or engage each other. Moreover, for example, the locking elements 54 and/or 56 are angled at their respective bases or ends to help the covering panel 22 rotate into said proper position. As the fastening element 32 gets threaded onto the fastening element 18 and thus the wheel 14, the locking elements 54 of the covering panel 22 interact or interlock with the corresponding locking elements 56 of the fastening element 18 mounted to the mounting bracket 12 and thus the wheel 14. Preferably, the fastening element 18 is secured against rotations in relation to the mounting bracket 12 which in turn is secured against rotations in relation to the wheel 14. Thus, when the locking elements 54 engage the corresponding locking elements 56, the covering panel 22 is supported on the fastening element 18 in its circumferential direction, i.e. around the rotation axis, and the covering panel 22 is constrained from rotating around the rotation axis in relation to the fastening element 18, the mounting bracket 12 and the wheel 14.

For example, the fastening element 18 is or may act as a threaded receiver having the thread 20 to receive the fastening element 32. The button 26 may sit inside the threaded receiver at least partially. Preferably, the button 26, in particular the operation area 30, penetrates the fastening element 18. The button 26 may be translationally moved along said moving direction, i.e. in the first and second directions in relation to the fastening element 18. However, preferably, the button 26 is secured against rotations around the rotation axis in relation to the fastening element 18. Thus, preferably, when the fastening element 32 is rotated around the rotation axis in relation to the covering panel 24 and in relation to the fastening element 18, the button 26 is not rotated around the rotation axis in relation to the fastening element 18 such that the fastening element 32 and in particular its ramps 40 and receptacles 38 may be rotated about the rotation axis in relation to the button 26. Thus, the pegs 26 may be caused to slide along the ramps 40 and from the ramps 40 into the receptacles 38.

The operation area 30 is a central portion. In relation to said central portion, the pegs 28 are outboard pegs of the button 26. In order to limit the button 26 from rotating about the rotation axis in relation to the fastening element 18, the fastening element 18 has respective elements such as walls 58 on which the button 26 is or may be supported in the circumferential direction of the fastening element 18, i.e. about the rotation axis both in the first and second directions of rotation.

As shown in FIG. 4, with respect to the moving direction and thus the axial direction of the wheel 14, the ramp 40 starts on a first high level and ends on a second high level, wherein the ramp 40 ends at the respective receptacle 38, and wherein the second high level is higher than the first high level. This means, for example, the respective ramp 40 rises from the surface 46 in the first direction and thus towards the wheel 14 with respect to a completely assembled state of the vehicle. Moreover, for example, the respective receptacle 38 is bound by a respective wall area 60 of the second fastening element 32, wherein the respective receptacle 38 is bound by the respective wall area 60 in said second direction. With respect to the moving direction and thus the axial direction of the wheel 14, the respective wall area 60 is arranged on the first high level or on a third height level being lower than the second high level and higher than the first high level. Thus, the spring is tensioned when the pegs 28 are arranged in the receptacles 38. Moreover, the fastening element 32 may not be rotated about the rotation axis in relation to the covering panel 22, the fastening element 18 and the button 26 since the receptacles 38 are limited or confined by the walls 48 and 50 on both ends, in both the first and second directions of rotation. Thus, the respective peg 28 arranged in the respective receptacle 38 is overlapped on both sides and thus in both the first and second directions of rotation by the walls 48 and 50. As a consequence, the fastening element 32 cannot be rotated about the rotation axis in relation to the button 26, the fastening element 18 and the covering panel 22 when the pegs 28 are arranged in the receptacles 38.

In order to fix or attach the covering panel 22 to the wheel 14, the fastening element 32 is threaded onto the threaded receiver. After the fastening element 32 is partially threaded onto the threaded receiver, the ramps 40 engage with the pegs 28, and the button 26 gets depressed, i.e. the button 26 is moved in the first direction as the fastening element 32 continues rotating. As the pegs 28 pass over the receptacles 38, the spring pushes the button 26 and thus the pegs 28 into the receptacles 38. This prevents the fastening element 32 from any further rotation and may cause an audible clicking noise which is also referred to as a "click". Preferably, the receptacles 38 are designed such that the threads 20 and 36 are fully engaged at a point when the pegs 28 engage the corresponding receptacles 38. In order to reach said point at which the threads 20 and 36 are fully engaged, the fastening element 32 should have made at least one complete rotation while it is threaded. In order to remove the covering panel 22 from the wheel 14, a person presses the operation area 30 and thus the center of the button 26 thereby moving the button 26 and thus the pegs 28 along the moving direction and in the first direction. Thereby, the pegs 28 are moved, in particular pushed, out of the receptacles 38. With the button 26 depressed, the fastening element 32 may be turned such that the threads 20 and 36 are unthreaded, i.e. such that fastening element 32 is unthreaded from the threaded receiver. Subsequently, the covering panel 22 and the fastening element 32 may be moved away from the fastening element 18 and thus the button 26 and the wheel 14.

In order to press or depress the button 26 whilst the covering panel 22 is fixed to the wheel 14, at least the operation area 30 of the button 26 penetrates the through openings 24 and 34. Thus, the covering panel 22 may be mounted to and dismounted from the wheel 14 in a particularly easy way.

Figure 12:
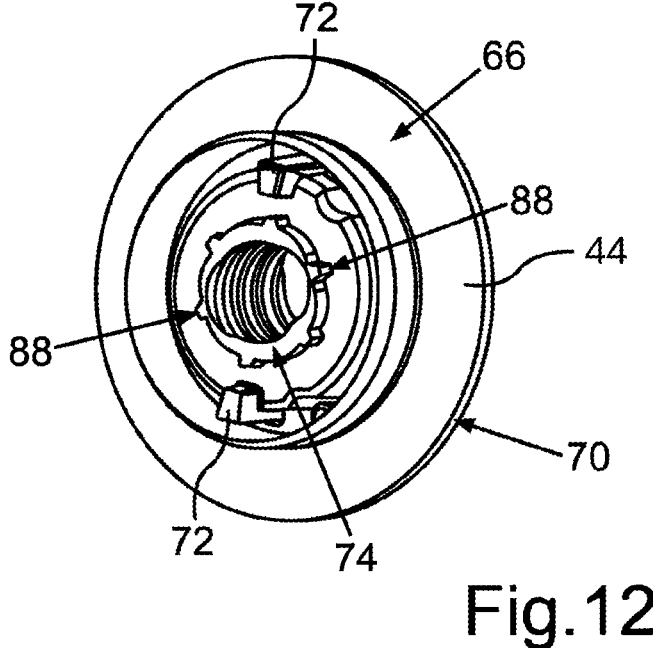
FIG. 12 is a schematic and perspective back view of the handle of the wheel cover device according to the second embodiment.
Figure 13:
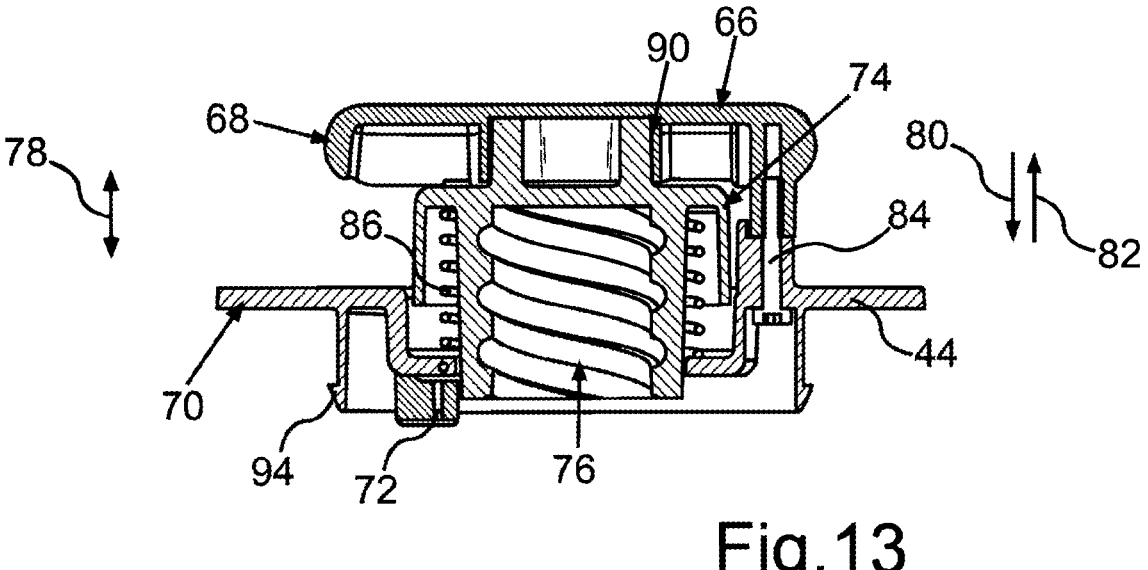
FIG. 13 is a schematic sectional view of the handle of the wheel cover device according to the second embodiment.
Figure 14:
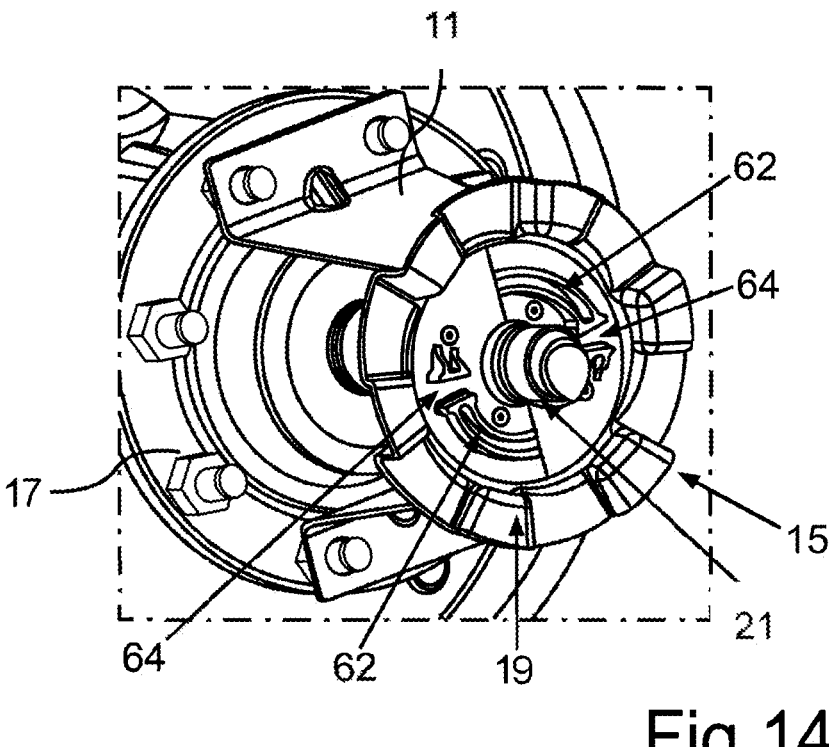
FIG. 14 is a schematic and perspective front view of a mounting bracket and a fastening element of the wheel cover device according to the second embodiment.
Figure 15:
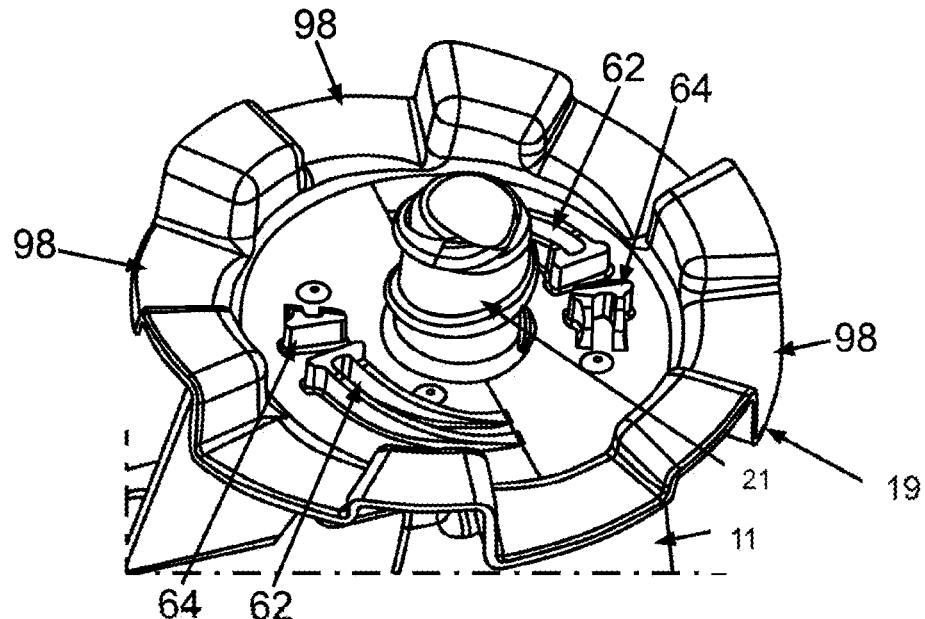
FIG. 15 is a schematic and perspective view of the fastening element of the wheel cover device according to the second embodiment.

FIGS. 8 to 15 show a second embodiment of a wheel cover device 9. In the second embodiment, the wheel cover device 9 comprises the mounting bracket 11 (FIG. 14) which is mounted to the wheel 15. In particular, the mounting bracket 11 is mounted to the hub 17. In other words, the mounting bracket 11 is configured to be mounted to the wheel 15, in particular to the hub 17 of the wheel 15. The wheel cover device 9 comprises the fastening element 19 provided on the mounting bracket 11. As shown in FIG. 14, the fastening element 19 has the first thread 20 which is configured as an external thread. Furthermore, in the second embodiment, the fastening element 19 has ramps 62 which are spaced apart from each other in the circumferential direction of the fastening element 19. Furthermore, a respective receptacle 64 of fastening element 19 is assigned to the respective ramp 62. In other words, a receptacle 64 of the fastening element 19 provided per ramp 62.

Figures 8, 9:
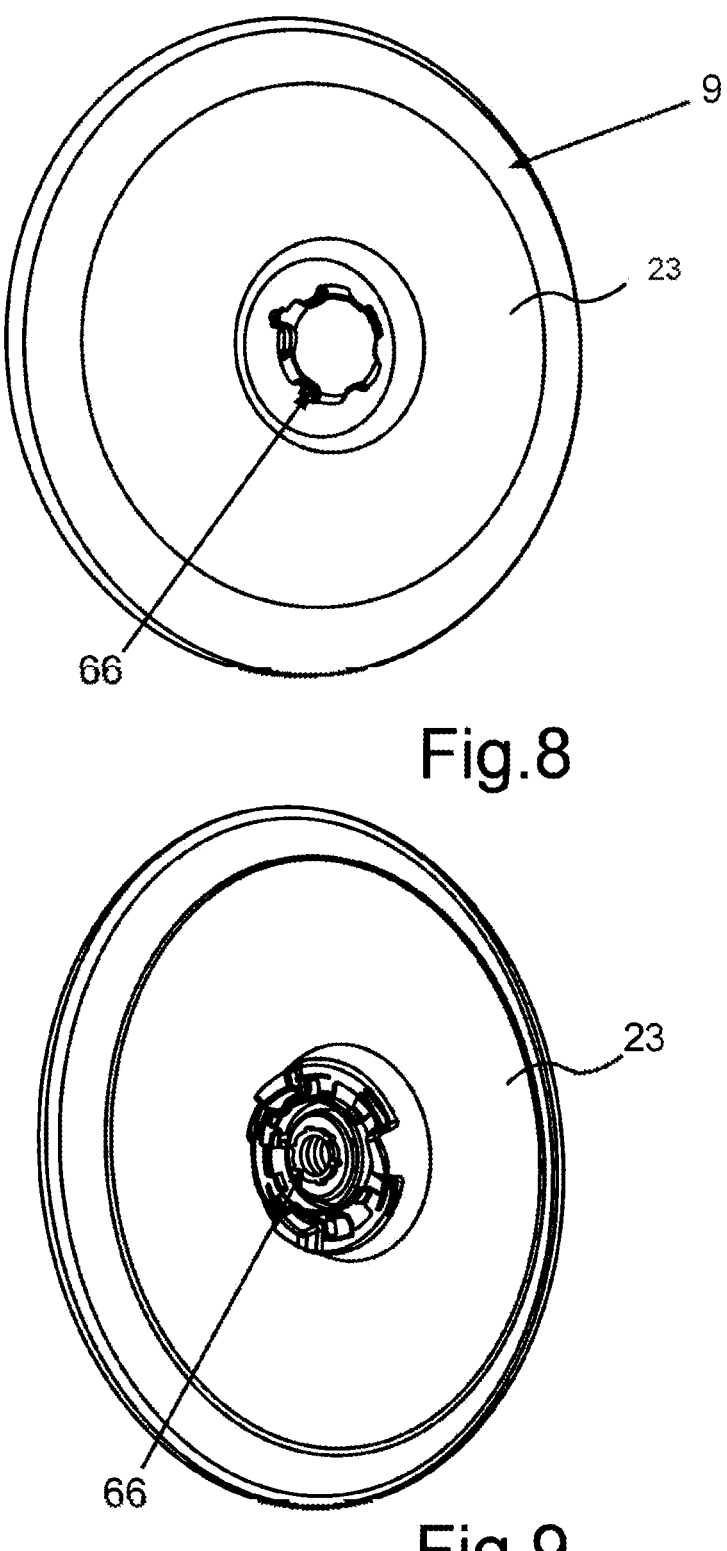
FIG. 8 is a schematic and perspective front view of the wheel cover device according to a second embodiment of the present invention.
FIG. 9 is a schematic and perspective back view of the wheel cover device according to the second embodiment.
Figures 10, 11:
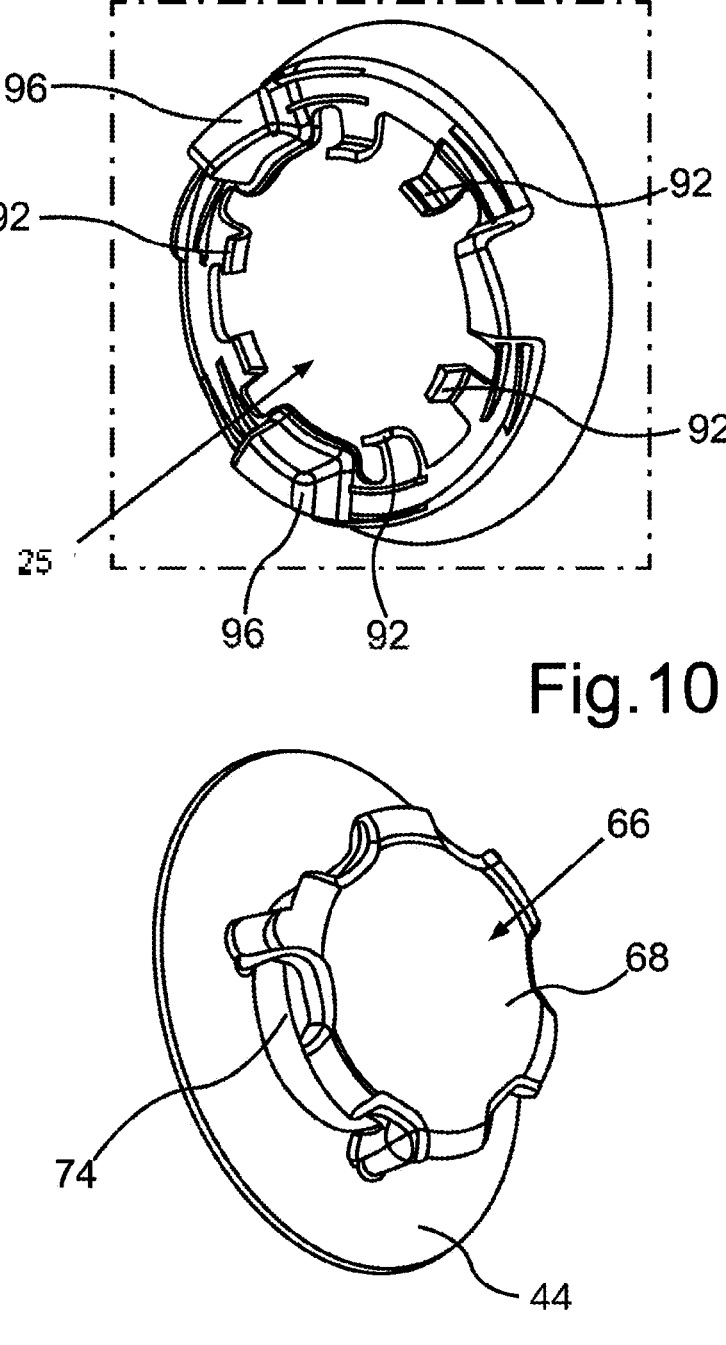
FIG. 10 is part of a schematic and perspective view of a covering panel of the wheel cover device according to the second embodiment.
FIG. 11 is a schematic and perspective front view of a handle of the wheel cover device according to the second embodiment.

As shown in FIGS. 8 to 10, the wheel cover device 9 further comprises the covering panel 23 having a through opening 25 which is, preferably, configured as a central through opening of the covering panel 23. The covering panel 23 according to the second embodiment is configured to cover the wheel 15 in the axial direction of the wheel 15.

In the second embodiment, the wheel cover device 9 comprises a handle 66 which is shown in FIGS. 11 to 14. The handle 66 has a grip portion 68 via which the handle 66 may be handled and, in particular, rotated and translationally moved by a person. This means the handle 66 may be manually handled, in particular manually rotated via the grip portion 68. The handle 66 further comprises a peg portion 70 having a peg 72 per receptacle 64. The handle 66 further comprises a threaded portion 74 having a second thread 76 which is, in the second embodiment, configured as an internal thread corresponding to the first thread 21. In an embodiment, the second thread 76 may be configured as a multi-start thread in order to more easily accommodate the first thread 21. This means the threads 21 and 76 may be threaded together. In the second embodiment, the grip portion 68, the peg portion 70 and the threaded portion 74 are configured as separately manufactured components forming an assembly. The threaded portion 74 is translationally movable in relation to the grip and peg portions 68 and 70 along a moving direction which is illustrated in FIG. 13 by an arrow 78. This means the threaded portion 74 may be translationally moved in relation to the grip and peg portions 68 and 70 into a first direction illustrated by an arrow 80, the first direction being parallel to the moving direction. Moreover, in particular after translationally moving the threaded portion 74 into the first direction in relation to the grip and peg portions 68 and 70, the threaded portion 74 may be translationally moved in relation to the grip and peg portions 68 and 70 into a second direction illustrated by an arrow 82, the second direction being parallel to the moving direction. Moreover, the grip portion 68, the peg portion 70 and the threaded portion 74 are connected with each other in a rotationally fixed manner such that the threaded portion 74 is connected with both the peg portion 70 and the grip portion 68 in a rotationally fixed manner. Thus, by rotating the grip portion 68, in particular in relation to the covering panel 23 and the fastening element 19, the grip portion 68, the peg portion 70 and the threaded portion 74 are rotated together, in particular in relation to the covering panel 23 and in relation to the fastening element 19. In the second embodiment, the grip portion 68 and the peg portion 70 are configured as separately manufactured components wherein the grip portion 68 and the peg portion 70 are connected with each other by at least one screw 84 in particular in such a way that the grip portion 68 and the peg portion 70 may not be translationally moved in relation to each other. In other words, the grip portion 68 and the peg portion 70 are connected with each other in such a way that translationally movements of the grip and the peg portions 68 and 70 in relation to each other are avoided. Additionally, the handle 66 further comprises a spring element 86 which may be configured as a mechanical spring. The spring element 86 may be part of said assembly. In the second embodiment, the threaded portion 74 is supported on the peg portion 70 along the moving direction, in particular into the first direction. Thus, by translationally moving the threaded portion 74 into the first direction in relation to the grip and peg portions 68 and 70, the spring element 86 is tensioned, in particular compressed. In other words, by translationally moving the grip and peg portions 68 and 70 into the second direction in relation to the threaded portion 74, the spring element 86 is tensioned, in particular compressed. By tensioning, in particular compressing, the spring element 86, the spring element 86 provides a spring force. By the spring force (i.e. when the spring element 86 is allowed to relax) the grip and peg portions 68 and 70 are translationally movable into the first direction in relation to the threaded portion 74.

As shown in FIG. 12, the peg portion 70 and the threaded portion 74 comprise interlocking features 88 by which the peg and threaded portions 70 and 74 are connected with each other in a rotationally fixed manner. Furthermore, the grip portion 68 and the threaded portion 74 comprise further interlocking features 90 by which the grip and threaded portions 68 and 74 are connected with each other in a rotationally fixed manner.

The fastening element 19 is also referred to as a threaded receiver since, as will be explained in greater detail below, the handle 66 is connected with the fastening element 19 by the threads 21 and 76 in order to attach the covering panel 23 to the fastening element 19 and thus the mounting bracket 11 and the wheel 15. In order to fix the covering panel 23 to the fastening element 19 and thus the mounting bracket 11 and the wheel 15, the handle 66 is inserted into the through opening 25 such that the handle 66, in particular the threaded portion 74 and the peg portion 70 penetrates or penetrate the through opening 25. Whilst the handle 66 penetrates the through opening 25, the grip portion 68 and thus the peg portion 70 and the threaded portion 74 are rotated in relation to the covering panel 23 and in relation to the fastening element 19 in such a way that the threaded portion 74 and the fastening element 19 are screwed together by the threads 21 and 76. Whilst the handle 66 is rotated in relation to the covering panel 23 and in relation to the fastening element 19 in order to screw the threaded portion 74 and the fastening element 19 together by the threads 21 and 76, the pegs 72 slide along the ramps 62. Thereby, the peg portion 70 and the grip portion 68 are translationally moved into the second direction in relation to the threaded portion 74 by the peg 72 sliding along the ramps 62 since the threaded portion 74 is prevented from translationally moving together with the grip and peg portion 68 and 70 by the threads 21 and 76 interacting with each other. Since the grip and peg portion 68 and 70 are translationally moved into the second direction in relation to the threaded portion 74, the spring element 86 is compressed (i.e. tensioned). The handle 66 is rotated in relation to the covering panel 23 and in relation to the fastening element 19 and thus the grip and peg portion 68 and 70 are translationally moved into the second direction in relation to the threaded portion 74 and away from the fastening element 19 along the moving direction until the pegs 72 reach the corresponding receptacles 64. This means by rotating the handle 66 in relation to the covering panel 23 and in relation to the fastening element 19, the pegs 72 are slid along the ramps 62 and, subsequently, moved from the ramps 62 to the receptacle 64 (i.e. the pegs 72 are moved from the ramps 62 in overlap with the receptacles 64). As a result of moving the pegs 72 in overlap with the receptacles 64, the spring element 86 relaxes such that the grip and peg portions 68 and 70 are translationally moved into the first direction in relation the threaded portion 74 whereby the pegs 72 are translationally moved into the receptacles 64 along the moving direction, in particular into the first direction. As a result, a further rotation of the handle 66 in relation to the fastening element 19 is at least constrained or avoided.

In the second embodiment, the wheel cover device 9 comprises two components. A first one of said components is a covering panel 23, and the second component is the handle 66. The handle 66 penetrating the through opening 25 is free to rotate inside the covering panel 23. As shown in FIGS. 10 and 13, the covering panel 23 and the handle 66 comprise respective clip features 92 and 94 respectively which hold the handle 66 and the covering panel 23 together and allow the handle 66 to be freely rotated whilst penetrating the through opening 25. Furthermore, the covering panel 23 comprises interlocking features 96 (FIG. 10) which may interlock with corresponding interlocking features 98 of the fastening element 19. Since the fastening element 19 is mounted to the mounting bracket 11, the fastening element 19 and thus the interlocking features 98, the ramps 62, the receptacles 64 and the thread 21 are provided on the mounting bracket 11. By the interlocking features 96 interlocking with the interlocking features 98 the covering panel 23 is aligned as the covering panel 23 is attached to the wheel 15. In other words, the interlocking features 96 and 98 provide for an alignment as the covering panel 23 is attached to the wheel 15. The thread 76 may join with a corresponding thread 21 as the threaded portion 74 and the fastening element 19 are threaded together. As the handle 66 is threaded onto the fastening element 19 and thus the wheel 15, the interlocking features 96 interlock with the corresponding interlocking features 98 of the fastening element 19, thereby supporting and constraining the covering panel 23 from rotating in relation to the fastening element 19 and thus the mounting bracket 11.

The handle 66 is itself said assembly comprising the grip portion 68, the peg portion 70 and the threaded portion 74 and, for example, the spring element 86. The threaded portion 74 is a threaded core, wherein the grip portion 68 and the peg portion 70 are fastened over the spring 86 and the threaded core. The threaded core is free to translationally move in the direction of the spring element 86 inside the handle 66 (inside the grip and peg portion 68 and 70). For example, the interlocking features 90 are arranged at a top part of the handle 66 wherein the interlocking features 88 are arranged at a bottom part of the handle 66.

For example, the mounting bracket 11 and the fastening element 19 (threaded receiver) form a wheel mounted assembly. The fastening element 19 has the thread 21 to receive the handle 66. The fastening element 19 further has the interlocking features 98 which may interlock with the corresponding interlocking features 96 of the covering panel 23. The fastening element 19 also comprises the receptacles 64 which are also referred to as peg receptacles.

To attach the covering panel 23 to the wheel 15, the handle 66 is threaded onto the fastening element 19. After the handle 66 is partially threaded onto the fastening element 19, the pegs 72 of the handle 66 engage the ramps 62 of the fastening element 19, and the peg portion 70 of the handle 66 is pushed away from the fastening element 19 as the handle 66 continuous turning or rotating. Since the threaded core is translationally movable in relation to the grip and peg portions 68 and 70 but translationally interlocked in relation to the grip and peg portions 68 and 70, the threaded core continues threading onto the fastening element 19 while the grip and peg portions 68 and 70 are pushed out (i.e. are translationally moved in relation to the threaded portion 74 and away from the fastening element 19 along the moving direction, in particular into the second direction). As the peg 72 pass over the corresponding receptacle 64, the spring element 86 relaxes and pushes the grip and peg portions 68 and 70 into the first direction in relation to a fastening element 19 and in relation to the threaded portion 74 such that the pegs 72 are pushed into the receptacles 64. This prevents the handle 66 from any further rotation and may cause an audible click (i.e. an audible clicking sound). The receptacles 64 are designed such that the threads 21 and 74 are fully engaged at the point when the pegs 72 engage the corresponding receptacles 64. It takes at least one full rotation of the handle 66 for the receptacles 64 to be fully engaged by the pegs 72.

The invention claimed is:

1. A wheel cover device for a vehicle, comprising:

a mounting bracket configured to be mounted to a wheel of the vehicle;

a first fastening element provided on the mounting bracket, the first fastening element having a first thread;

a covering panel for covering the wheel in the axial direction of the wheel, the covering panel having a first through opening;

a button movably held on the mounting bracket and the first fastening element, the button comprising at least one peg;

a spring supported on the mounting bracket and the button; and a second fastening element having a second thread, at least one receptacle, and at least one ramp, wherein, for fixing the covering panel to the first fastening element, the second fastening element is configured to be inserted into the first through opening and, subsequently, rotated in relation to the covering panel, the first fastening element and the button to screw the first fastening element and second fastening element together by the first thread and second thread thereby causing the at least one peg to slide along the at least one ramp and from the at least one ramp into the at least one receptacle such that the spring is tensioned thereby tensioning the at least one peg into the at least one receptacle by the spring.

2. The wheel cover device according to claim 1, wherein, with respect to the axial direction of the wheel, the at least one ramp starts on a first height level and ends on a second height level higher than the first height level, and wherein the at least one receptacle is limited by a wall area of the second fastening element in the axial direction of the wheel, the wall area, with respect to the axial direction of the wheel, being arranged on the first height level or on a third height level being lower than the second height level and higher than the first height level.

3. The wheel cover device according to claim 1, wherein at least one of the covering panel and the second fastening element comprises at least one coupling element configured to hold the second fastening element in the first through opening and on the covering panel in the axial direction of the wheel while allowing the second fastening element to be rotated in relation to the covering panel.

4. The wheel cover device according to claim 1, wherein:

the covering panel comprises at least one first locking element; and the first fastening element comprises at least one second locking element, wherein the at least one first locking element and at least one second locking element are configured to interact with each other thereby constraining the covering panel from rotating in relation to the first fastening element.

5. The wheel cover device according to claim 1, wherein the second fastening element comprises a second through opening, and wherein the button is configured to be inserted into the first through opening and second through opening when screwing the first fastening element and second fastening element together by the first thread and second thread.

6. A wheel cover device for a vehicle, comprising:

a mounting bracket configured to be mounted to a wheel of the vehicle;

a first fastening element provided on the mounting bracket, the first fastening element having a first thread, at least one ramp, and at least one receptacle;

a covering panel for covering the wheel in the axial direction of the wheel, the covering panel having a through opening; and a handle having:

a grip portion for manually rotating the handle;

a peg portion comprising at least one peg;

a threaded portion comprising a second thread, the threaded portion being translationally movable in relation to the grip and peg portions along a moving direction, wherein the threaded portion is connected with both the peg portion and the grip portion in a rotationally fixed manner, wherein at least one spring element by which the threaded portion is supported on the peg portion along the moving direction, and for fixing the covering panel to the first fastening element, the handle is configured to be inserted into the through opening and, subsequently, rotated by the grip portion in relation to the covering panel and the first fastening element to screw the first fastening element and the threaded portion together by the threads thereby causing the at least one peg to slide along the at least one ramp such that, while tensioning the spring, the grip and peg portions are translationally moved away from the first fastening element in relation to the threaded portion along the moving direction until the at least one peg reaches the at least one receptacle whereupon the at least one spring element at least partially relaxes thereby moving the at least one peg into the at least one receptacle while translationally moving the grip and peg portions in relation to the threaded portion along the moving direction.

7. The wheel cover device according to claim 6, wherein the grip portion and the peg portion are formed by separately manufactured components which are connected with each other.

8. The wheel cover device according to claim 6, wherein, with respect to the axial direction of the wheel, the at least one ramp starts on a first height level and ends on a second height level being higher than the first height level, and wherein the at least one receptacle is limited by a wall area of the first fastening element in the axial direction of the wheel, the wall area, with respect to the axial direction of the wheel, being arranged on the first height level or on a third height level being lower than the second height level and higher than the first height level.

9. The wheel cover device according to claim 6, wherein the at least one ramp and the first thread are formed in one piece.

10. The wheel cover device according to claim 6, wherein:

the covering panel comprises at least one first locking element; and the first fastening element comprises at least one second locking element, the at least one first locking element and at least one second locking element being configured to interact with each other thereby constraining the covering panel from rotating in relation to the first fastening element.

* * * * *